US012664166B2

(12) United States Patent
Colmenares Diaz et al.

(10) Patent No.: US 12,664,166 B2
(45) Date of Patent: Jun. 23, 2026

(54) MITIGATION OF COMPUTATIONAL GRAPH LINEAGE GROWTH

(71) Applicant: Microsoft Technology Licensing, LLC, Redmond, WA (US)

(72) Inventors: Juan Andres Colmenares Diaz, Redmond, WA (US); Tushar Goyal, Redmond, WA (US); Ainur Smagulova, Redmond, WA (US); Javier Cano Vila, Redmond, WA (US); Yuanyuan Tian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/744,242

(22) Filed: Jun. 14, 2024

(65) Prior Publication Data

US 2025/0384042 A1      Dec. 18, 2025

(51) Int. Cl.
| | |
|---|---|
| *G06F 16/2453* | (2019.01) |
| *G06F 16/22* | (2019.01) |
| *G06F 16/242* | (2019.01) |

(52) U.S. Cl.
CPC .... *G06F 16/24549* (2019.01); *G06F 16/2282* (2019.01); *G06F 16/2425* (2019.01)

(58) Field of Classification Search
CPC ...................... G06F 16/24568; G06F 16/2474
USPC ........................................................ 707/769
See application file for complete search history.

(56) References Cited

U.S. PATENT DOCUMENTS

| | | | | |
|---|---|---|---|---|
| 9,280,581 | B1 | 3/2016 | Grimes | |
| 10,628,421 | B2 | 4/2020 | Devarao | |
| 10,901,973 | B1 | 1/2021 | Senra et al. | |
| 11,216,455 | B2 | 1/2022 | Tong | |
| 11,656,868 | B1 * | 5/2023 | Gottlob | G06F 8/30 717/106 |
| 2004/0204838 | A1 | 10/2004 | Chen et al. | |
| 2008/0168071 | A1 | 7/2008 | Dykes et al. | |

(Continued)

FOREIGN PATENT DOCUMENTS

| | | |
|---|---|---|
| WO | 2009149262 A1 | 12/2009 |
| WO | 2019149262 A1 | 8/2019 |
| WO | 2024157776 A1 | 8/2024 |

OTHER PUBLICATIONS

Non-Final Office Action mailed on Feb. 7, 2025, in U.S. Appl. No. 18/658,751, 33 Pages.

(Continued)

*Primary Examiner* — Hung T Vy
(74) *Attorney, Agent, or Firm* — ArentFox Schiff LLP

(57) ABSTRACT
Example implementations include a system and a computer-implemented method for breaking computational graph lineages configured for identifying at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop. The implementations further include inserting a breakage of a computational graph lineage of at least one of the first variable or the second variable.

18 Claims, 9 Drawing Sheets

(56) References Cited

U.S. PATENT DOCUMENTS

| | | | |
|---|---|---|---|
| 2010/0031162 A1* | 2/2010 | Wiser | H04N 21/431 |
| | | | 715/747 |
| 2016/0071233 A1 | 3/2016 | Macko et al. | |
| 2016/0342708 A1 | 11/2016 | Fokoue-Nkoutche | |
| 2017/0068748 A1 | 3/2017 | Hu et al. | |
| 2017/0193016 A1 | 7/2017 | Kulkarni | |
| 2017/0364534 A1 | 12/2017 | Zhang | |
| 2018/0011945 A1 | 1/2018 | Vaquero Gonzalez | |
| 2018/0039710 A1 | 2/2018 | Chen et al. | |
| 2018/0225314 A1 | 8/2018 | Devarao | |
| 2019/0121810 A1 | 4/2019 | Zhuang | |
| 2019/0171655 A1 | 6/2019 | Psota et al. | |
| 2020/0201909 A1 | 6/2020 | Das et al. | |
| 2021/0056104 A1 | 2/2021 | Tong et al. | |
| 2021/0253063 A1 | 8/2021 | Pupillo | |
| 2021/0256063 A1 | 8/2021 | Kasperovics et al. | |
| 2022/0138262 A1 | 5/2022 | Yan et al. | |
| 2022/0245147 A1 | 8/2022 | Segalini et al. | |
| 2023/0175856 A1 | 6/2023 | Khoe | |
| 2023/0176856 A1 | 6/2023 | Yan et al. | |
| 2023/0267120 A1 | 8/2023 | Hugo | |
| 2025/0348474 A1 | 11/2025 | Balasubramanian et al. | |
| 2025/0348515 A1 | 11/2025 | Balasubramanian et al. | |
| 2025/0371001 A1 | 12/2025 | Andres | |

OTHER PUBLICATIONS

Non-Final Office Action mailed on Feb. 27, 2025, in U.S. Appl. No. 18/679,250, 17 Pages.

Non-Final Office Action mailed on Jun. 4, 2025, in U.S. Appl. No. 18/658,800, 32 pages.

Extended European Search Report received in European Application No. 25176679.6, mailed on Jul. 30, 2025, 12 pages.

Final Office Action mailed on Aug. 11, 2025, in U.S. Appl. No. 18/679,250, 19 pages.

Final Office Action mailed on Jul. 15, 2025, in U.S. Appl. No. 18/658,751, 11 pages.

Notice of Allowance mailed on Oct. 15, 2025, in U.S. Appl. No. 18/658,751, 08 pages.

Extended European search report received for European Application No. 25174447.0, mailed on Aug. 18, 2025, 9 Pages.

Koutras, et al., "OmniMatch: Effective Self-Supervised Any-Join Discovery in Tabular Data Repositories", Retrieved from: https://arxiv.org/abs/2403.07653, Mar. 12, 2024, 14 Pages.

Notice of Allowance mailed on Sep. 30, 2025, in U.S. Appl. No. 18/658,800, 05 pages.

Communication pursuant to Rule 69 EPC—reminder concerning payment of the designation fee (Art. 79(2) EPC) and 1 of the examination fee (Art. 94(1) EPC)—and invitation pursuant to Rule 70a(1), Received in European Patent Application No. 25176679.6, mailed on Dec. 8, 2025, 02 pages.

* cited by examiner

200

Figure 4:
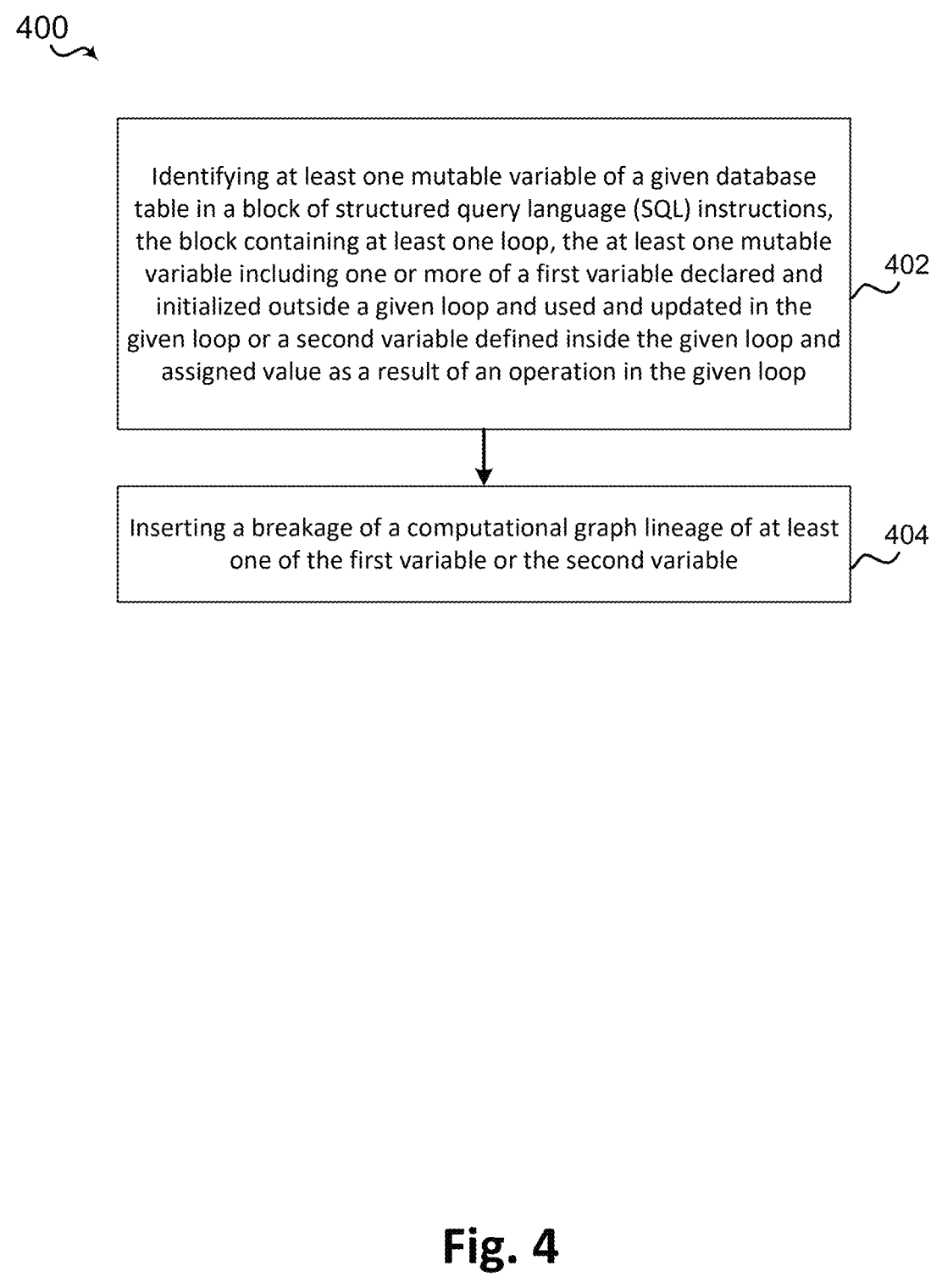

400

Identifying at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop      402

Inserting a breakage of a computational graph lineage of at least one of the first variable or the second variable      404

Enabling the breakage every *k* iterations of the loop, where *k* is a natural number greater than zero.

602

400

400

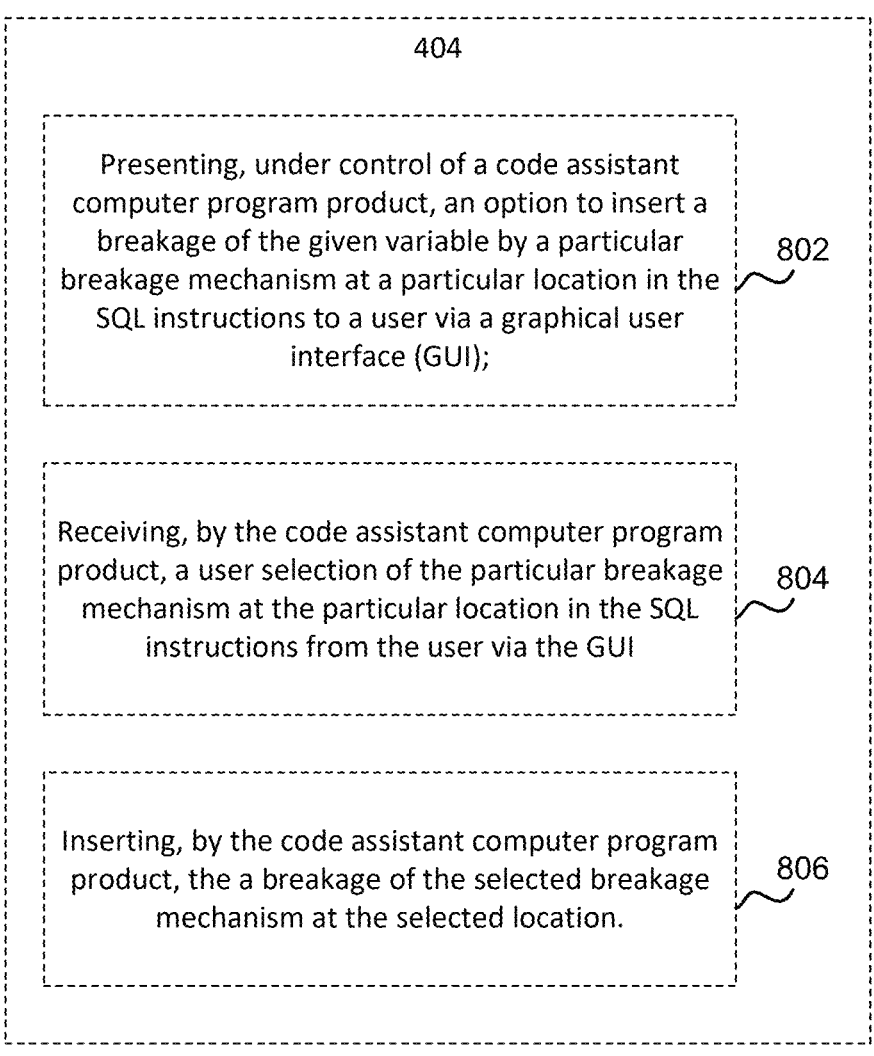

404

Presenting, under control of a code assistant computer program product, an option to insert a breakage of the given variable by a particular breakage mechanism at a particular location in the SQL instructions to a user via a graphical user interface (GUI);

802

Receiving, by the code assistant computer program product, a user selection of the particular breakage mechanism at the particular location in the SQL instructions from the user via the GUI

804

Inserting, by the code assistant computer program product, the a breakage of the selected breakage mechanism at the selected location.

Figure 9:
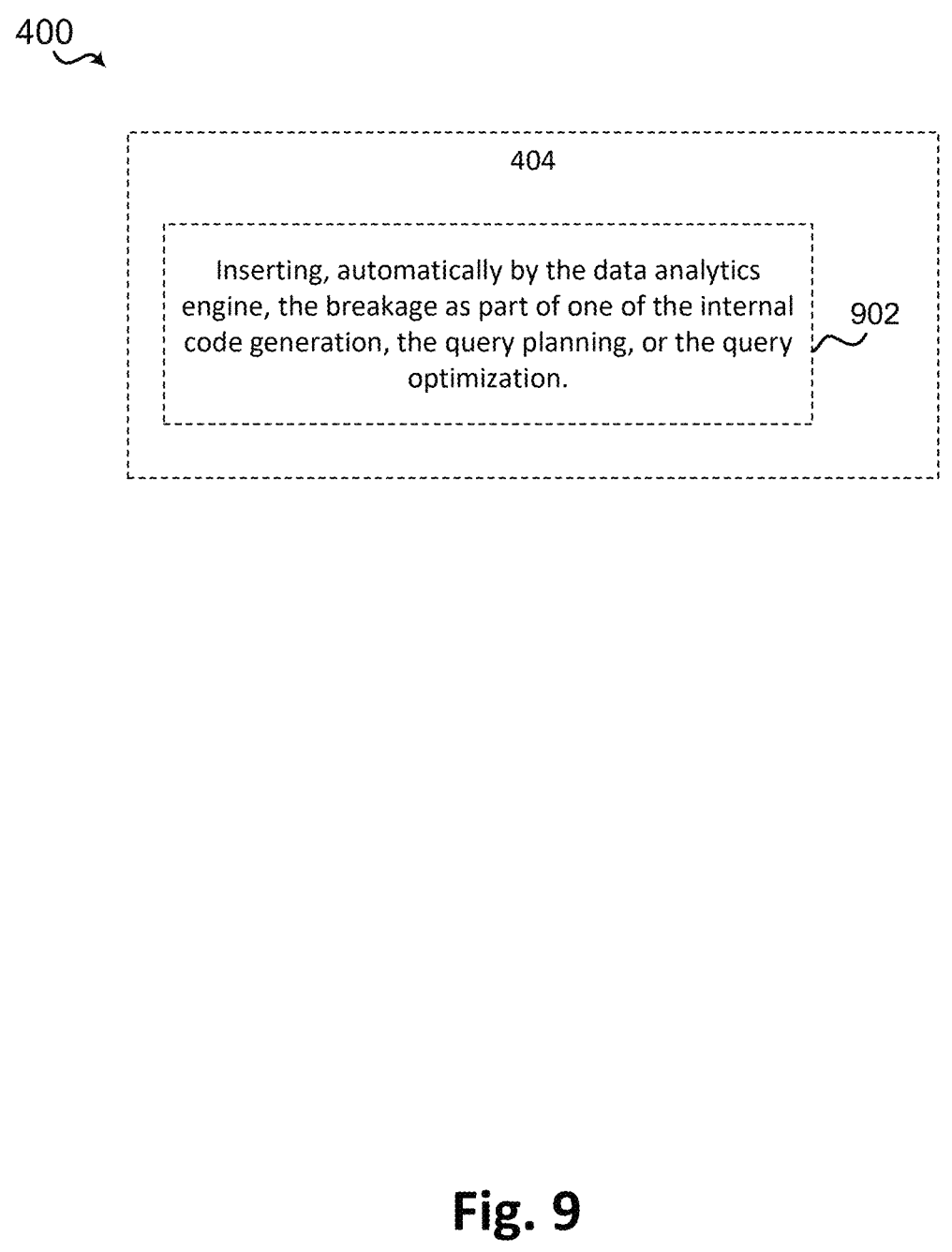

Inserting, automatically by the data analytics engine, the breakage as part of one of the internal code generation, the query planning, or the query optimization.

MITIGATION OF COMPUTATIONAL GRAPH LINEAGE GROWTH

BACKGROUND

The technology disclosed herein relates to improved execution of computer programs across one or more computer platforms. Examples of the technology disclosed herein related to mitigation of computational graph lineage growth in iterative computer programs written in structured query language (SQL).

A data processing engine is a software application intended, inter alia, to enable the conversion of raw data into meaningful information. Such engines are typically designed to process large amounts of data in a variety of formats, such as structured, semi-structured, or unstructured data. Data processing engines can carry out a range of operations, including: data ingestion (e.g., collecting data from various sources and bringing it into the system for processing), data transformation (e.g., converting data from one format or structure to another); data analysis (e.g., using statistical methods to discover patterns, trends, and insights in the data); data storage (e.g., storing processed data in a manner that supports efficient retrieval and analysis); and data output (e.g., presenting the processed data in a useful format, such as a report or visualization).

Examples of data processing engines include Apache Spark, Trino, and Databricks, among others. These engines are often used in the context of big data, where the volume, variety, and velocity of data require more advanced and scalable processing methods.

SQL (Structured Query Language) query engines are tools that interpret and execute SQL queries against one or more databases. They allow users to retrieve, insert, update, delete, and manipulate data stored in database(s) by executing SQL commands. In the context of data processing engines, SQL query engines are used as an interface to interact with data stored in various formats and locations. The query engines allow users to analyze and manipulate data in the database(s) using SQL, a language that is widely understood by data professionals.

For instance, Apache Spark's SQL module allows users to perform data querying tasks in Spark using SQL or a "DataFrame" API. As another example, Trino is a distributed SQL query engine itself. It is designed to query large datasets that reside in distributed storage systems. Trino does not store data itself, but fetches data from multiple sources like Hadoop, S3, MySQL, and others, allowing users to analyze data across sources as if they were in a single database.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a computer-implemented method for breaking computational graph lineages, comprising identifying at least one mutable variable of a given database table in a block of structured query language (SQL) instructions, the block containing at least one loop, the at least one mutable variable including one or more of i) a first variable declared and initialized outside a given loop and used and updated in the given loop, or ii) a second variable defined inside the given loop and assigned value as a result of an operation in the given loop. The method further includes inserting a breakage of a computational graph lineage of at least one of the first variable or the second variable.

Another example aspect includes an apparatus for breaking computational graph lineages, comprising one or more memories and one or more processors coupled with one or more memories and configured to perform, individually or in any combination, the follow actions. The one or more processors are configured to identify at least one mutable variable of a given database table in a block of structured query language (SQL) instructions, the block containing at least one loop, the at least one mutable variable including one or more of i) a first variable declared and initialized outside a given loop and used and updated in the given loop, or ii) a second variable defined inside the given loop and assigned value as a result of an operation in the given loop. The one or more processors are further configured to insert a breakage of a computational graph lineage of at least one of the first variable or the second variable.

Another example aspect includes an apparatus for breaking computational graph lineages, comprising means for identifying at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop. The apparatus further includes means for inserting a breakage of a computational graph lineage of at least one of the first variable or the second variable.

Another example aspect includes a computer-implemented computer-readable medium having instructions stored thereon for breaking computational graph lineages, wherein the instructions are executable by one or more processors, individually or in combination, to identify at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop. The instructions are further executable to insert a breakage of a computational graph lineage of at least one of the first variable or the second variable.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like

Figure 1:
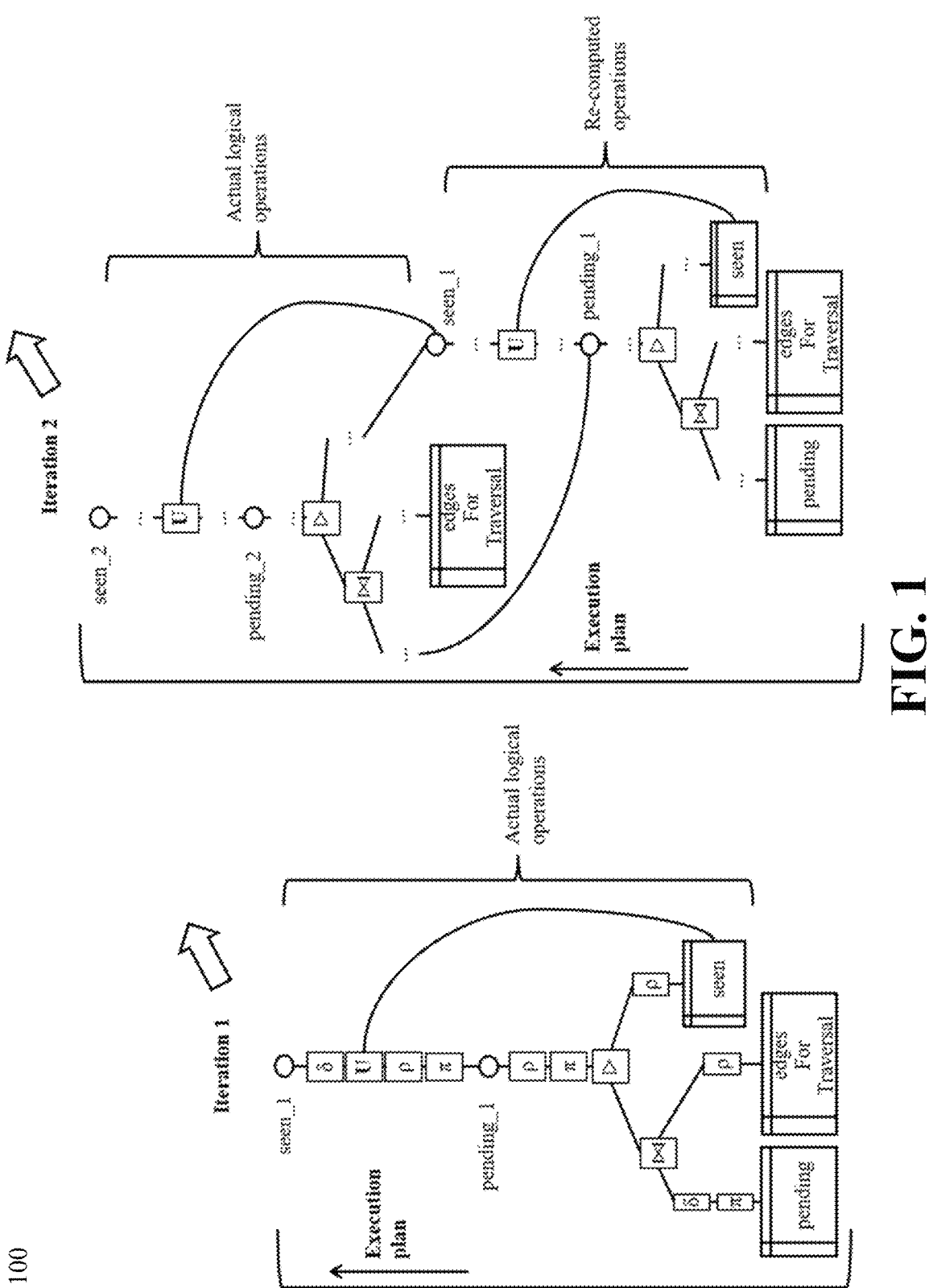

3 designations denote like elements, wherein dashed lines may indicate optional elements, and in which:

FIG. 1 illustrates an execution plan for the code portion of TABLE 1, in accordance with examples of the technology disclosed herein.

Figure 2:
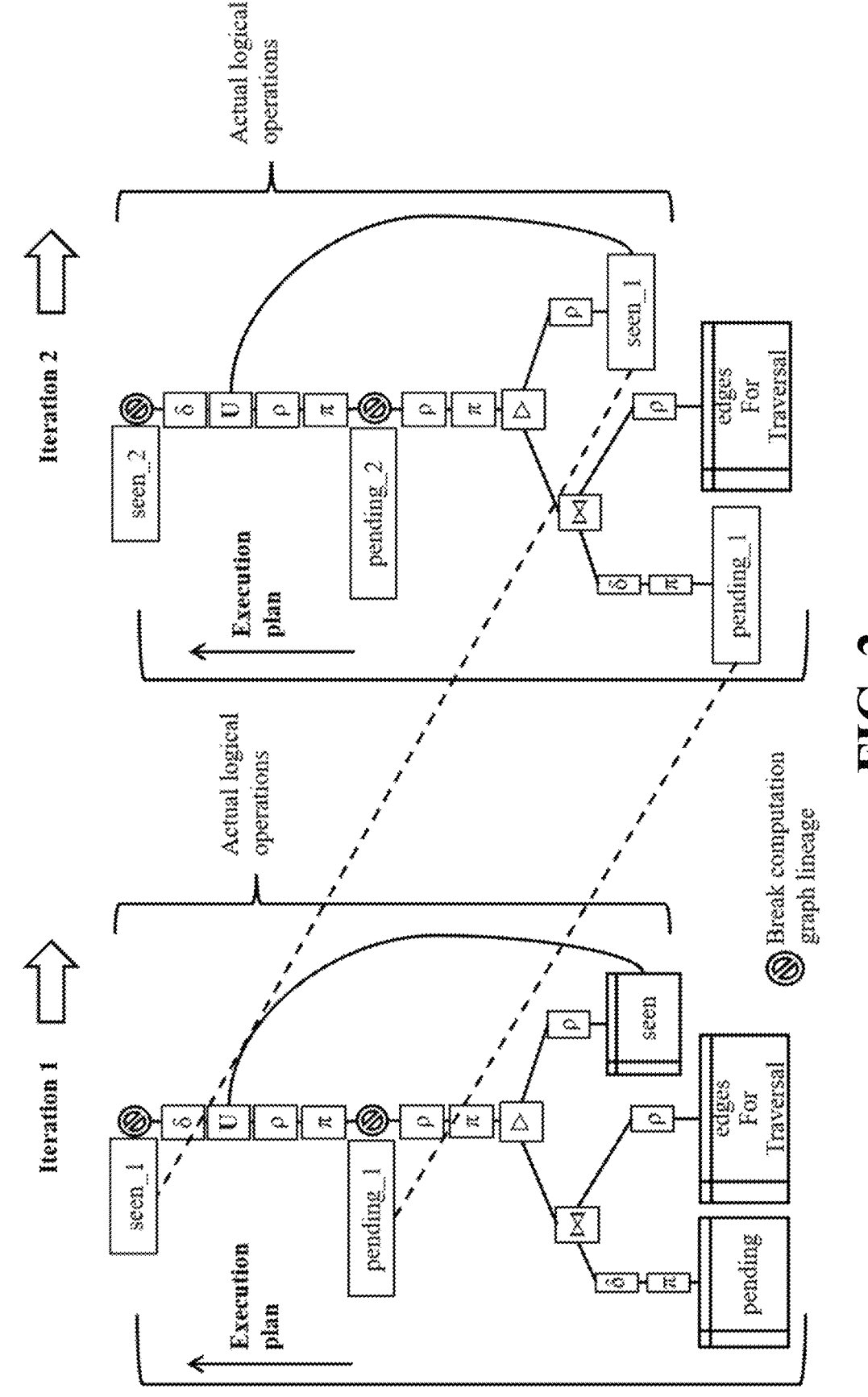

FIG. 2 illustrates an execution plan for the code portion of TABLE 2, in accordance with examples of the technology disclosed herein.

Figure 3:
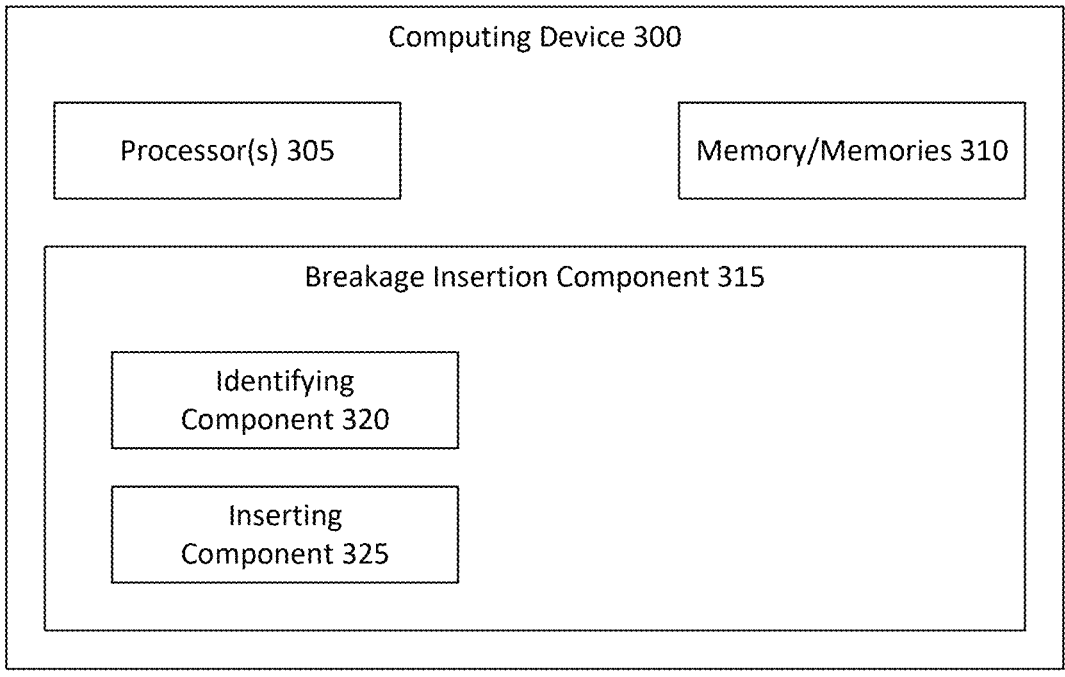

FIG. 3 is a block diagram of an example of a computer device having components configured to perform a computer-implemented method for breaking computational graph lineages, in accordance with examples of the technology disclosed herein.

FIG. 4 is a flowchart of an example of a computer-implemented method for breaking computational graph lineages, in accordance with examples of the technology disclosed herein.

Figure 5:
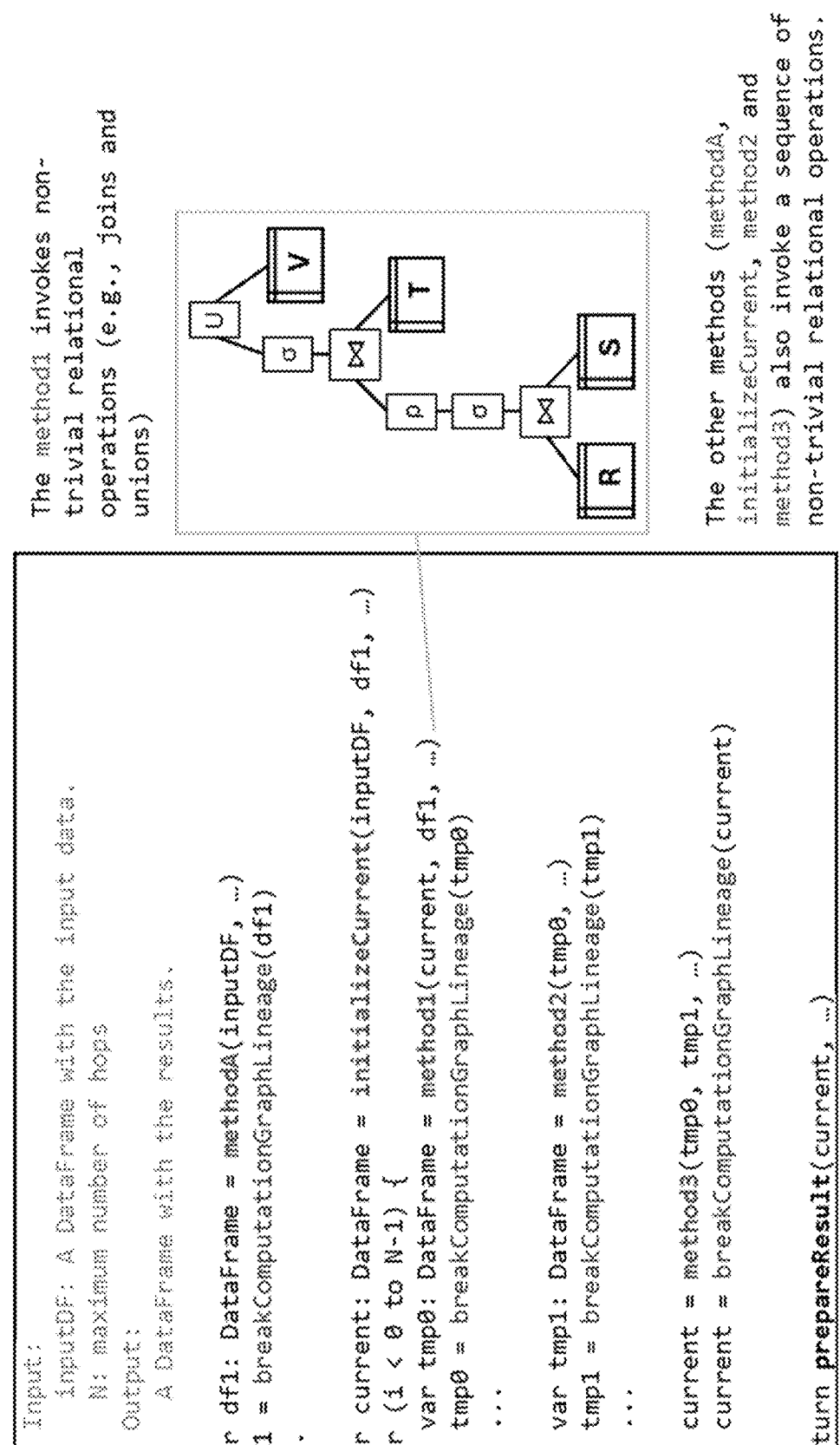

FIG. 5 is a flowchart of additional aspects of the method of FIG. 4, in accordance with examples of the technology disclosed herein.

Figure 6:
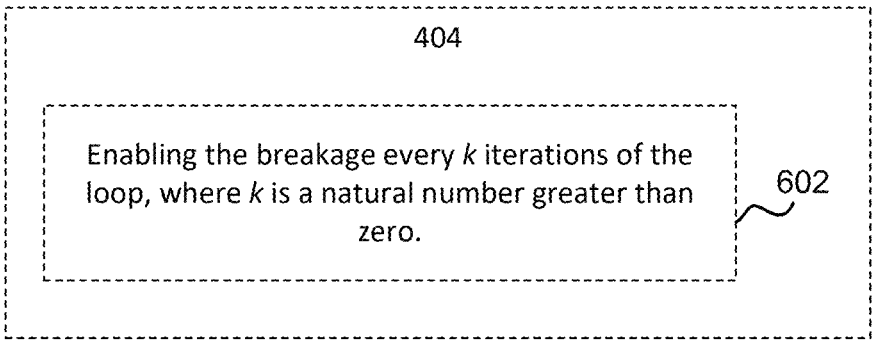

FIG. 6 is a flowchart of additional aspects of the method of FIG. 4, in accordance with examples of the technology disclosed herein.

Figure 7:
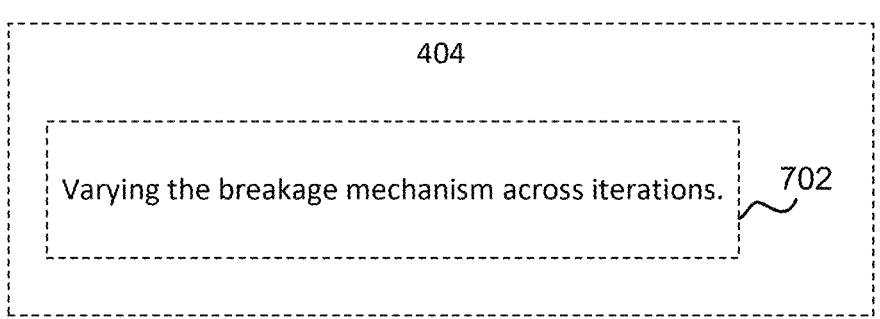

FIG. 7 is a flowchart of additional aspects of the method of FIG. 4, in accordance with examples of the technology disclosed herein.

FIG. 8 is a flowchart of additional aspects of the method of FIG. 4, in accordance with examples of the technology disclosed herein.

FIG. 9 is a flowchart of additional aspects of the method of FIG. 4, in accordance with examples of the technology disclosed herein.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Data analytics engines, like Spark and Trino, feature query optimization components (e.g., Apache Spark's Catalyst, Trino's query optimizer, and Databrick's Photon) to accelerate SQL queries.

However, the query processing components, particularly the query planner and query optimizer, in these data analytics engines can misbehave when presented with iterative computational loops (e.g., "while" and "for" loops) containing SQL statements. Such iterative loops are essential to implementing algorithms on big data (e.g., graph algorithms and machine learning training algorithms). One factor is that the engines can be oblivious to the iteration loops and the engine's query plans grow on each iteration with no bound, slowing down the algorithms' execution, at times to halt.

Consider, as an example the portion of a SQL-based program, written in Scala (for Apache Spark), that performs a breadth first search (BFS) traversal in a graph starting from a set of source vertices, shown in Table 1. "GraphFrame. SRC" and others refer to graphframe library elements, e.g., from Github.

TABLE 1

```
...
var pending: DataFrame = sourceVertices
    .select(F.col(GraphFrame.ID).as("source"),
        F.col(GraphFrame.ID).as("reached"))
var seen: DataFrame = pending.withColumnRenamed("reached", "visited")
val edgesForTraversal = edges
    .filter(s"${GraphFrame.SRC} != ${GraphFrame.DST}")
    .select(F.col(GraphFrame.SRC).as("predecessor"),
        F.col(GraphFrame.DST).as("successor"))
while (!pending.isEmpty) { // Iterative loop
    var outgoingEdgesToNewVertices = pending
        .drop("predecessor")
        .dropDuplicates( )
        .join(edgesForTraversal.withColumnRenamed("predecessor", "reached"),
            Seq(reached), "inner")
        .join(seen.withColumnRenamed("visited", "successor"),
            Seq("source", "successor"), "left_anti")
    pending = outgoingEdgesToNewVertices
        .select(F.col("source"),
            F.col("reached").as("predecessor"),
            F.col("successor").as("reached"))
    seen = pending
        .select(F.col("source"), F.col("reached").as("visited"))
        .unionByName(seen)
        .dropDuplicates( )
}
...
```

Referring to FIG. 1, an execution plan 100 for the code portion of TABLE 1 is illustrated, in accordance with examples of the technology disclosed herein. FIG. 1 shows that for the code shown in TABLE 1, the execution plan 100 grows as the iterations progress. One reason is the re- computation of operations perform in previous iterations.

This problem may be addressed manually by inserting instructions in the algorithms' implementation code to break the computation graph lineage (i.e., to break the query plan). However, such an approach is sub-optimal. Addressing the problem by manually inserting breakages, while feasible, requires a laborious trial-and-error process where human intervention is needed to evaluate runtime. Manual methods rely more on intuition developed over time rather than clear-cut approaches. For larger programs, this process becomes extremely time-consuming and error-prone.

In a running example of the technology disclosed herein, breakComputationGraphLineage statements can be inserted automatically on the mutable DataFrame variables "pending" and "seen," defined outside the loop but updated inside it, as show in TABLE 2 with bold underline.

TABLE 2

```
...
var pending: DataFrame = sourceVertices
    .select(F.col(GraphFrame.ID).as("source"),
        F.col(GraphFrame.ID).as("reached"))
var seen: DataFrame = pending.withColumnRenamed("reached", "visited")
val edgesForTraversal = edges
    .filter(s"${GraphFrame.SRC} != ${GraphFrame.DST}")
    .select(F.col(GraphFrame.SRC).as("predecessor"),
        F.col(GraphFrame.DST).as("successor"))
while (!pending.isEmpty) { // Iterative loop
    var outgoingEdgesToNewVertices = pending
        .drop("predecessor")
        .dropDuplicates( )
        .join(edgesForTraversal.withColumnRenamed("predecessor", "reached"),
            Seq(reached), "inner")
        .join(seen.withColumnRenamed("visited", "successor"),
            Seq("source", "successor"), "left_anti")
    pending = outgoingEdgesToNewVertices
        .select(F.col("source"),
            F.col("reached").as("predecessor"),
            F.col("successor").as("reached"))
    pending = breakComputationGraphLineage(pending)
    seen = pending
        .select(F.col("source"), F.col("reached").as("visited"))
        .unionByName(seen)
        .dropDuplicates( )
    seen = breakComputationGraphLineage(seen)
}
...
```

Referring to FIG. 2, and continuing to refer to prior figures for context, an execution plan 200 for the code portion of TABLE 2 is illustrated, in accordance with examples of the technology disclosed herein. As illustrated in FIG. 2, the effect of adding the breakComputationGraph-Lineage statement on the variables "pending" and "seen" is that the length of the execution plan in every iteration is bounded and constant.

The mechanisms to implement the breakComputation-GraphLineage statement can be specific to the data analytics engine. For example, in the case of Spark, the computation graph lineage (query plan) can be broken either: by check-pointing a DataFrame (e.g., pending in the running example), or by creating a new cached copy of a DataFrame (e.g., converting the DataFrame to a resilient distributed data set (RDD), caches the RDD, and creating a new DataFrame). These mechanisms incur different computational costs; checkpointing tends to be costlier than creating a new cached copy of a DataFrame.

Referring to FIG. 3 and FIG. 4, and continuing to refer to prior figures for context,, in operation, computing device 300 or system (e.g., one or more processors coupled with one or more memories and configured, individually or in combination to perform the methods described herein) may perform a computer-implemented method 400 for breaking computational graph lineages, such as via execution of breakage insertion component 315 by one or more proces-sors 305 configured, individually or in any combination, to execute instructions to perform the following actions, and/or configured to communicate with one or more memories 310 to obtain and execute the instructions. For simplicity of presentation, the techniques are described assuming SQL-based programs with a single iterative loop, but the tech-niques are applicable to programs with multiple iterative loops, including nested loops. Further, examples of the technology disclosed herein include a non-transitory com-puter-readable medium having instructions stored thereon for breaking computational graph lineages as described herein.

At step 402, the method 400 includes identifying, by one or more processors executing instructions stored in memory, at least one mutable variable of a given database table in a block of structured query language (SQL) instructions, the block containing at least one loop. The at least one mutable variable includes one or more of i) a first variable declared and initialized outside a given loop and used and updated in the given loop and ii) a second variable defined inside the given loop and assigned value as a result of an operation in the given loop.

For example, in an aspect, computer device 300, one or more processors 305, one or more memories 310, breakage insertion component 315, and/or identifying component 320 may be configured to or may comprise means for identifying at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop.

For example, the identifying at step 402 examines two contexts for the mutable variable. In context [1], the method identifies any first mutable variable declared and initialized outside a given loop and used and updated in the given loop. Such first mutable variables typically store intermediate results that one or more iterative computation have accumulated thus far. A common location to apply a breakage of the computational graph lineage for such variables is close to or at the end of the iterative loop, where the mutable variables are often updated with intermediate results, including those variables controlling the loop's exit condition.

In context [2], the method identifies variables that are defined inside the iterative loop's scope, e.g., mutable variables that are loop-local and as such, their life only spans the current iteration. These context [2] variables store intermediate results produced within the current iteration of the loop, which in turn can be used to compute intermediate results stored in mutable variables defined outside the loop and whose lifespan transcends the current iteration (e.g., the mutable variables addressed in context [1]). In context [2], examples of the technology disclosed herein identify computation DataFrame variables that are defined inside the iterative loop, and store the result of a sequence of non-trivial (and possibly expensive) relational operations, such as joins, unions, and sorting, particularly those involving data reshuffling across hosts.

At step 404, the method 400 includes inserting a breakage of a computational graph lineage of at least one of the first variable or the second variable. For example, in an aspect, computer device 300, one or more processors 305, one or more memories 310, breakage insertion component 315, and/or inserting component 325 may be configured to or may comprise means for inserting a breakage of a computational graph lineage of at least one of the first variable or the second variable.

In context [1], on every iteration of the loop, the computation graph lineage on each of these variables is broken through insertion of a breakage once the variable is updated and prepared for use in the next iteration or after the loop exits. In some cases the computation graph lineage is broken by inserting a statement on each of these variables right after its initialization (before and outside the loop) if the initialization logic involves a sequence of non-trivial (and possibly expensive) relational operations, such as joins, unions, and sorting, particularly those involving data reshuffling.

In context [2], the technology breaks the computation graph lineage on DataFrame variables that: 1) are defined inside the iterative loop, and 2) store the result of a sequence of non-trivial (and possibly expensive) relational operations, such as joins, unions, and sorting, particularly those involving data reshuffling across hosts. In some examples, the breakage of computation graph lineage on such a loop-local variable is inserted before subsequent statements use the variable, possibly in combination with other similar variables, to derive results that will be stored in mutable variables defined outside the loop.

As noted above, the mechanisms to implement the break-ComputationGraphLineage statement can be specific to the data analytics engine. For example, in the case of Spark, the computation graph lineage (query plan) can be broken either: by checkpointing a DataFrame (e.g., pending in our running example), or by creating a new cached copy of a DataFrame (i.e., it converts the DataFrame to a resilient distributed data set (RDD), caches the RDD, and creates a new DataFrame). These mechanisms incur different computational costs; checkpointing tends to be costlier than creating a new cached copy of a DataFrame.

Referring to FIG. 5, and continuing to refer to prior figures for context, example insertions 500 are illustrated, in accordance with examples of the technology disclosed herein. In such example insertions 500, breakages are inserted around methods or functions as follows: 1) on loop-local variables before the loop-local variables are passed to a method (or function) that carries out non-trivial data processing operations (e.g., join and union) on these variables, and 2) the DataFrame variables the method (or function) returns.

Referring to FIG. 6, in an alternative or additional aspect and continuing to refer to prior figures for context, at step 602, the inserting at step 404 of the breakage of the computational graph lineage of the at least one of the first variable or the second variable further comprises enabling the breakage every k iterations of the loop, where k is a natural number greater than zero.

With regard to Step 602 (enable breaking computation graph lineage every 'k' iterations of the loop, where k is a natural number larger than zero (k=1, 2, 3, 4, . . . )), the value of 'k' can be assigned based on the cost, complexity, or length of the computation graph inside the loop, or other similar factors. Step 602 tends to be effective for iterative loops with simple logic (e.g., a short sequence of relational operations). In an alternative or additional aspect, k is a function of one or more of a resource cost of executing the breakage, a complexity of the computation graph associated with the given variable, or a length of the computation graph associated with the given variable.

Referring to FIG. 7, in an alternative or additional aspect wherein the language of the SQL instructions comprises a plurality of breakage mechanism, at block 702, the inserting at block 404 of the breakage of the computational graph lineage of a given variable further comprises varying the breakage mechanism across iterations.

Data analytics engine often offer multiple mechanisms $\{m_1, m_2, \ldots, m_n\}$ for breaking computation graph lineage with different cost and other properties. This technique enables the use of a specific mechanism $m_i$, where i∈[1, n], in the k-th iteration of the loop. For example, Spark offers two mechanisms $\{m_1 =$ "checkpointing", $m_2 =$ "creating a new cached copy of the DataFrame"}. This technique allows alternating the mechanisms so that, for example, $m_1 =$ "checkpointing" is used every 4 iterations and $m_2$ in the others.

Referring to FIG. 8, in an alternative or additional aspect, at step 802, the inserting at step 404 of the breakage of the computational graph lineage of the at least one of the first variable or the second variable further includes presenting, under control of a code assistant computer program product, an option to insert a breakage of the given variable by a particular breakage mechanism at a particular location in the SQL instructions to a user via a graphical user interface (GUI).

Code assistants that leverage source code analysis, including Integrated Development Environments (IDEs) and Artificial Intelligence (AI) Copilots, can detect code patterns in iterative loops in SQL-based programs and suggest the inclusion or include statements for breaking the computation graph lineage in the source code of the program.

In this optional aspect, at step 804, the inserting at step 404 of the breakage of the computational graph lineage of the at least one of the first variable or the second variable further includes receiving, by the code assistant computer program product, a user selection of the particular breakage mechanism at the particular location in the SQL instructions from the user via the GUI.

In this optional aspect, at step 806, the inserting at step 404 of the breakage of the computational graph lineage of the at least one of the first variable or the second variable further includes inserting, by the code assistant computer program product, the breakage of the selected breakage mechanism at the selected location.

Referring to FIG. 9, in an alternative or additional aspect wherein the SQL instructions are configured to be executed by a data analytics engine characterized by one or more of an internal code generation phase, a query planning phase, and a query optimization phase, at step 902, the inserting at step 404 of the breakage of the computational graph lineage of the at least one of the first variable or the second variable further comprises inserting, automatically by the data analytics engine, the breakage as part of one of the internal code generation, the query planning, or the query optimization.

Data analytics engines, such as Spark and Trino, can insert statements for breaking the computation graph lineage: i) during their internal code generation phase, ii) when their query planner generates the logical plan, or/and iii) when their query optimizer generates the execution (physical) plan.

For each of the methods above, the technology disclosed herein leverage runtime information about computational cost to decide where to insert the statements in the code or in the plans. Analytics engines have direct access to such cost information and can insert the statements in the generated code and plans, even at runtime. Code assistants, on the other hand, need to rely on an analytics engine to provide them with such information from past runs to suggest the addition of the statements in the source code.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A computer-implemented method for breaking computational graph lineages, comprising:
identifying, by one or more processors, at least one mutable variable of a given database table in a block of structured query language (SQL) instructions, the block containing at least one loop, the at least one mutable variable including one or more of i) a first variable declared and initialized outside a given loop and used and updated in the given loop, and ii) a second variable defined inside the given loop and assigned value as a result of an operation in the given loop; and
inserting, automatically by the one or more processors, a breakage of a computational graph lineage of at least one of the first variable or the second variable.

2. The computer-implemented method of claim 1, wherein inserting the breakage of the computational graph lineage of the at least one of the first variable or the second variable further comprises enabling the breakage every k iterations of the loop, where k is a natural number greater than zero.

3. The computer-implemented method of claim 2, wherein k is a function of one or more of a resource cost of executing the breakage, a complexity of the computation graph associated with the given variable, or a length of the computation graph associated with the given variable.

4. The computer-implemented method of claim 1:
wherein the language of the SQL instructions comprises a plurality of breakage mechanisms, and
wherein inserting the breakage of the computational graph lineage of a given variable further comprises varying the breakage mechanism across iterations.

5. The computer-implemented method of claim 1, wherein inserting the breakage of the computational graph lineage of the at least one of the first variable or the second variable further comprises:
presenting, under control of a code assistant computer program product, an option to insert a breakage of the given variable by a particular breakage mechanism at a particular location in the SQL instructions to a user via a graphical user interface (GUI);
receiving, by the code assistant computer program product, a user selection of the particular breakage mechanism at the particular location in the SQL instructions from the user via the GUI; and
inserting, by the code assistant computer program product, a breakage of the selected breakage mechanism at the selected location.

6. The computer-implemented method of claim 1:
wherein the SQL instructions are configured to be executed by a data analytics engine characterized by one or more of an internal code generation phase, a query planning phase, and a query optimization phase; and
wherein inserting the breakage of the computational graph lineage of the at least one of the first variable or the second variable further comprises inserting, automatically by the data analytics engine, the breakage as part of one of the internal code generation phase, the query planning phase, and the query optimization phase.

7. A system for breaking computational graph lineages, comprising:
one or more memories; and
one or more processors coupled with one or more memories and configured, individually or in combination, to:
identify at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop; and
insert, automatically, a breakage of a computational graph lineage of at least one of the first variable or the second variable.

8. The system of claim 7, wherein to insert the breakage of the computational graph lineage of the at least one of the first variable or the second variable the one or more processors are further configured to enable the breakage every k iterations of the loop, where k is a natural number greater than zero.

9. The system of claim 8, wherein k is a function of one or more of a resource cost of executing the breakage, a complexity of the computation graph associated with the given variable, or a length of the computation graph associated with the given variable.

10. The system of claim 7:

wherein the language of the SQL instructions comprises a plurality of breakage mechanisms, and wherein to insert the breakage of the computational graph lineage of a given variable the one or more processors are further configured to vary the breakage mechanism across iterations.

11. The system of claim 7, wherein to insert the breakage of the computational graph lineage of the at least one of the first variable or the second variable the one or more processors are further configured to:

present, under control of a code assistant computer program product, an option to insert a breakage of the given variable by a particular breakage mechanism at a particular location in the SQL instructions to a user via a graphical user interface (GUI);

receive, by the code assistant computer program product, a user selection of the particular breakage mechanism at the particular location in the SQL instructions from the user via the GUI; and insert, by the code assistant computer program product, a breakage of the selected breakage mechanism at the selected location.

12. The system of claim 7:

wherein the SQL instructions are configured to be executed by a data analytics engine characterized by one or more of an internal code generation phase, a query planning phase, and a query optimization phase, and wherein to insert the breakage of the computational graph lineage of the at least one of the first variable or the second variable the one or more processors are further configured to inserting, automatically by the data analytics engine, the breakage as part of one of the internal code generation phase, the query planning phase, and the query optimization phase.

13. A non-transitory computer-readable medium having instructions stored thereon for breaking computational graph lineages, wherein the instructions are executable by one or more processors, individually or in combination, to:

identify at least one mutable variable of a given database table in a block of structured query language (SQL) instructions, the block containing at least one loop, the at least one mutable variable including one or more of a first variable declared and initialized outside a given loop and used and updated in the given loop or a second variable defined inside the given loop and assigned value as a result of an operation in the given loop; and insert, automatically, a breakage of a computational graph lineage of at least one of the first variable or the second variable.

14. The non-transitory computer-readable medium having instructions stored thereon of claim 13, wherein to insert the breakage of the computational graph lineage of the at least one of the first variable or the second variable the instructions are further executable to enable the breakage every k iterations of the loop, where k is a natural number greater than zero.

15. The non-transitory computer-readable medium having instructions stored thereon of claim 14, wherein k is a function of one or more of a resource cost of executing the breakage, a complexity of the computation graph associated with the given variable, or a length of the computation graph associated with the given variable.

16. The non-transitory computer-readable medium having instructions stored thereon of claim 13:

wherein the language of the SQL instructions comprises a plurality of breakage mechanisms, and wherein to insert the breakage of the computational graph lineage of a given variable the instructions are further executable to vary the breakage mechanism across iterations.

17. The non-transitory computer-readable medium having instructions stored thereon of claim 13, wherein to insert the breakage of the computational graph lineage of the at least one of the first variable or the second variable the instructions are further executable to:

present, under control of a code assistant computer program product, an option to insert a breakage of the given variable by a particular breakage mechanism at a particular location in the SQL instructions to a user via a graphical user interface (GUI);

receive, by the code assistant computer program product, a user selection of the particular breakage mechanism at the particular location in the SQL instructions from the user via the GUI; and insert, by the code assistant computer program product, a breakage of the selected breakage mechanism at the selected location.

18. The non-transitory computer-readable medium having instructions stored thereon of claim 13:

wherein the SQL instructions are configured to be executed by a data analytics engine characterized by one or more of an internal code generation phase, a query planning phase, and a query optimization phase; and wherein to insert the breakage of the computational graph lineage of the at least one of the first variable or the second variable the instructions are further executable to insert, automatically by the data analytics engine, the breakage as part of one of the internal code generation phase, the query planning phase, and the query optimization phase.

\* \* \* \* \*